United States Patent
Aybay et al.

(10) Patent No.: US 8,446,916 B2
(45) Date of Patent: May 21, 2013

(54) FLOW CONSISTENT DYNAMIC LOAD BALANCING

(75) Inventors: Gunes Aybay, Los Altos, CA (US); Arthi Ayyangar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/555,828

(22) Filed: Jul. 23, 2012

(65) Prior Publication Data
US 2012/0287789 A1 Nov. 15, 2012

Related U.S. Application Data

(63) Continuation of application No. 12/257,901, filed on Oct. 24, 2008, now Pat. No. 8,228,929.

(51) Int. Cl.
*H04L 12/28* (2006.01)
*H04L 12/56* (2006.01)

(52) U.S. Cl.
USPC ............................. 370/412; 370/252; 370/254

(58) Field of Classification Search
USPC ...... 370/252–254, 230–235, 235.1, 387–392, 370/412–419
See application file for complete search history.

(56) References Cited

U.S. PATENT DOCUMENTS

| | | | | |
|---|---|---|---|---|
| 4,216,465 A | * | 8/1980 | Huelsman et al. | 341/138 |
| 5,164,937 A | * | 11/1992 | Tanabe et al. | 370/399 |
| 5,600,630 A | * | 2/1997 | Takano et al. | 370/218 |
| 5,838,677 A | * | 11/1998 | Kozaki et al. | 370/389 |
| 5,889,769 A | * | 3/1999 | Mizuno | 370/328 |
| 5,926,456 A | * | 7/1999 | Takano et al. | 370/218 |
| 6,031,838 A | * | 2/2000 | Okabe et al. | 370/395.6 |
| 6,266,325 B1 | * | 7/2001 | Ishioka et al. | 370/248 |
| 6,473,424 B1 | | 10/2002 | DeJager et al. | |
| 6,731,631 B1 | | 5/2004 | Chang et al. | |
| 6,907,001 B1 | * | 6/2005 | Nakayama et al. | 370/230 |
| 7,058,013 B2 | * | 6/2006 | Furuichi | 370/228 |
| 7,283,471 B2 | | 10/2007 | Gutierrez et al. | |
| 7,426,185 B1 | | 9/2008 | Musacchio et al. | |
| 8,005,012 B1 | | 8/2011 | Aybay et al. | |
| 8,228,929 B2 | * | 7/2012 | Aybay et al. | 370/412 |
| 2002/0178268 A1 | | 11/2002 | Aiken et al. | |
| 2004/0062266 A1 | | 4/2004 | Rojas et al. | |
| 2007/0041331 A1 | | 2/2007 | Ma et al. | |
| 2007/0147246 A1 | | 6/2007 | Hurley et al. | |
| 2009/0190580 A1 | | 7/2009 | Kailasam et al. | |
| 2010/0106866 A1 | * | 4/2010 | Aybay et al. | 710/29 |

FOREIGN PATENT DOCUMENTS
CN 1484413 A 3/2004

OTHER PUBLICATIONS

European Search Report corresponding to EP 09 17 1196, mailed Nov. 20, 2009, 8 pages.

* cited by examiner

*Primary Examiner* — Chuong T Ho
(74) *Attorney, Agent, or Firm* — Harrity & Harrity, LLP

(57) ABSTRACT

A device provides a flow table. The device receives a data unit, determines a data flow associated with the data unit, determines whether the flow table includes an entry corresponding to the data flow, determines a current utilization of a group of output ports of the device, selects an output port, of the group of output ports, for the data flow based on the current utilization of the group of output ports when the flow table does not store an entry corresponding to the data flow, and stores the data unit in a queue associated with the selected output port.

20 Claims, 9 Drawing Sheets

FLOW CONSISTENT DYNAMIC LOAD BALANCING

RELATED APPLICATION

This application is a continuation of U.S. patent application Ser. No. 12/257,901, filed Oct. 24, 2008, which is incorporated herein by reference.

BACKGROUND

In an increasingly networked world, more and more traffic, such as data, voice, and video, is transmitted over public and proprietary networks. Network devices typically perform some form of load balancing to increase the performance of the network. In a router, for example, the forwarding decision may include a lookup in a forwarding table to identify a logical output port. The logical output port may correspond to a single physical output port, or a group of physical output ports. A logical-port to physical-port mapping table may be used to map the logical output port to the physical output port(s) to which the logical output port corresponds.

A load balancing technique, used in a network device, includes performing a hash on received packets to identify one of the physical output ports, corresponding to the logical output port, from which to transmit the received packets. This kind of static hashing of received packets to physical output ports guarantees that packets, associated with a same flow, are transmitted from the same physical output port and, thus, do not become out of order.

The characteristics of flows may change over time, however. As a result, output ports can become overwhelmed with traffic, thereby defeating the load balancing that the hashing is supposed to accomplish.

SUMMARY

According to one implementation, a method, performed by a device, may include providing a flow table; receiving a data unit; determining a data flow associated with the data unit; determining whether the flow table includes an entry corresponding to the data flow; determining a current utilization of a group of output ports of the device; selecting an output port, of the group of output ports, for the data flow based on the current utilization of the group of output ports when the flow table does not store an entry corresponding to the data flow; and storing the data unit in a queue associated with the selected output port.

According to another implementation, a device may include a group of output ports, and a memory to store a flow table that includes a number of entries, where each of the entries may correspond to a different one of a set of data flows. The device may also include logic to receive a data unit, determine a data flow associated with the data unit, determine whether the flow table includes an entry corresponding to the data flow, determine whether at least a threshold amount of time has passed between the reception of the data unit and reception of a last data unit in the data flow when the flow table includes an entry corresponding to the data flow, determine a current utilization of the group of output ports when at least the threshold amount of time has passed between the reception of the data unit and the reception of the last data unit in the data flow, select an output port, of the group of output ports, for the data flow based on the current utilization of the group of output ports, and modify the entry in the flow table with information regarding the selected output port.

According to yet another implementation, a device may include a group of output ports, and a memory to store a flow table that includes a number of entries, each of the entries corresponding to a different one of a set of data flows and identifying one of the output ports. The device may also include logic to receive a data unit, determine a data flow associated with the data unit, determine whether the flow table includes an entry corresponding to the data flow, identify an output port, of the group of output ports, for the data flow from the flow table when the flow table includes an entry corresponding to the data flow, determine that the identified output port is unavailable, determine a current utilization of the group of output ports when the identified output port is unavailable, select an output port, of the group of output ports, for the data flow based on the current utilization of the group of output ports, and modify the entry in the flow table with information regarding the selected output port.

According to a further implementation, a device may include a group of output ports. The device may also include means for storing a flow table in a memory, the flow table including a number of entries, each of the entries corresponding to a different one of a set of data flows; means for analyzing a particular entry, of the number of entries, in the flow table to determine when a last data unit was received in a corresponding one of the data flows, where the particular entry identifies a particular output port of the group of output ports; means for determining a current utilization of the group of output ports when at least a threshold amount of time has passed since the last data unit was received; means for determining that the particular output port is overutilized with respect to other ones of the group of output ports based on the current utilization of the group of output ports; means for selecting another one of the group of output ports for the corresponding one of the data flows, where the other one of the plurality of output ports is less utilized with respect to the particular output port; and means for modifying the particular entry with information regarding the other one of the group of output ports.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

As described herein, a network device may perform load balancing across its output ports by dynamically assigning and/or re-assigning an output port to data units of a data flow based on the current utilization of the output ports. The term "data unit," as used herein, may refer to a packet, a datagram, or a cell; a fragment of a packet, a datagram or a cell; or another type or arrangement of data.

Exemplary Network

Figure 1:
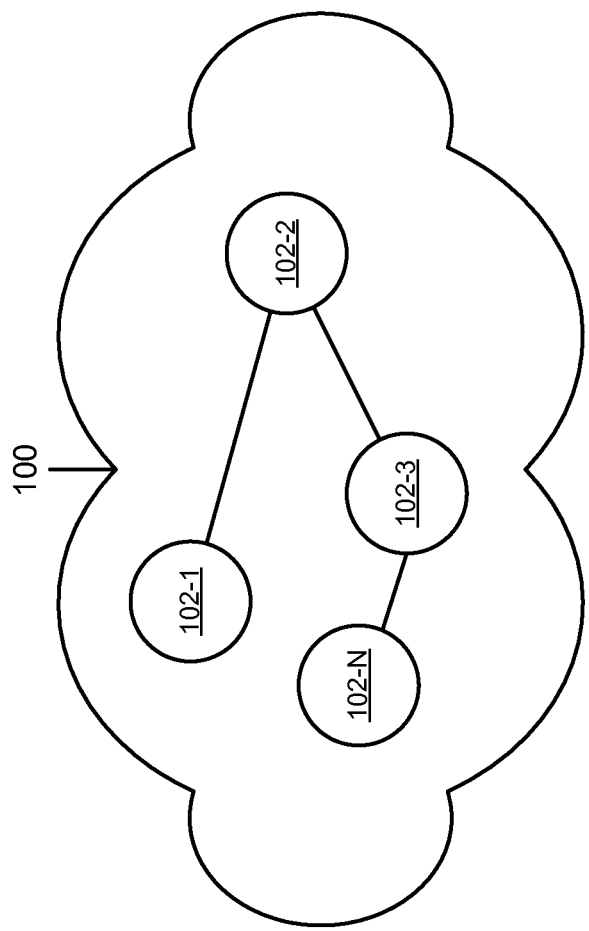
FIG. 1 is a diagram of an exemplary network in which systems and methods, described herein, may be implemented.

FIG. 1 is a diagram of an exemplary network 100 in which systems and methods, described herein, may be implemented. Network 100 may include any type of network, such as the Internet, an ad hoc network, a local area network (LAN), a wide area network (WAN), a metropolitan area network (MAN), a telephone network (e.g., a wireless communication network or the public switched telephone network (PSTN)), or a combination of networks.

As shown, network 100 may include N network devices 102-1 through 102-N (collectively referred to herein as "network devices 102," or individually as "network device 102") ($N \geq 1$). Each of network devices 102-1 through 102-N may include a switch, a router, a server, or another type of device. While network devices 102-1 through 102-N can be implemented as different types of devices, in the following paragraphs, network devices 102-1 through 102-N will be described in terms of a router. The links interconnecting network devices 102-1 through 102-N are shown by way of example. Network devices 102-1 through 102-N may be interconnected via different links than those shown in FIG. 1.

Figure 2:
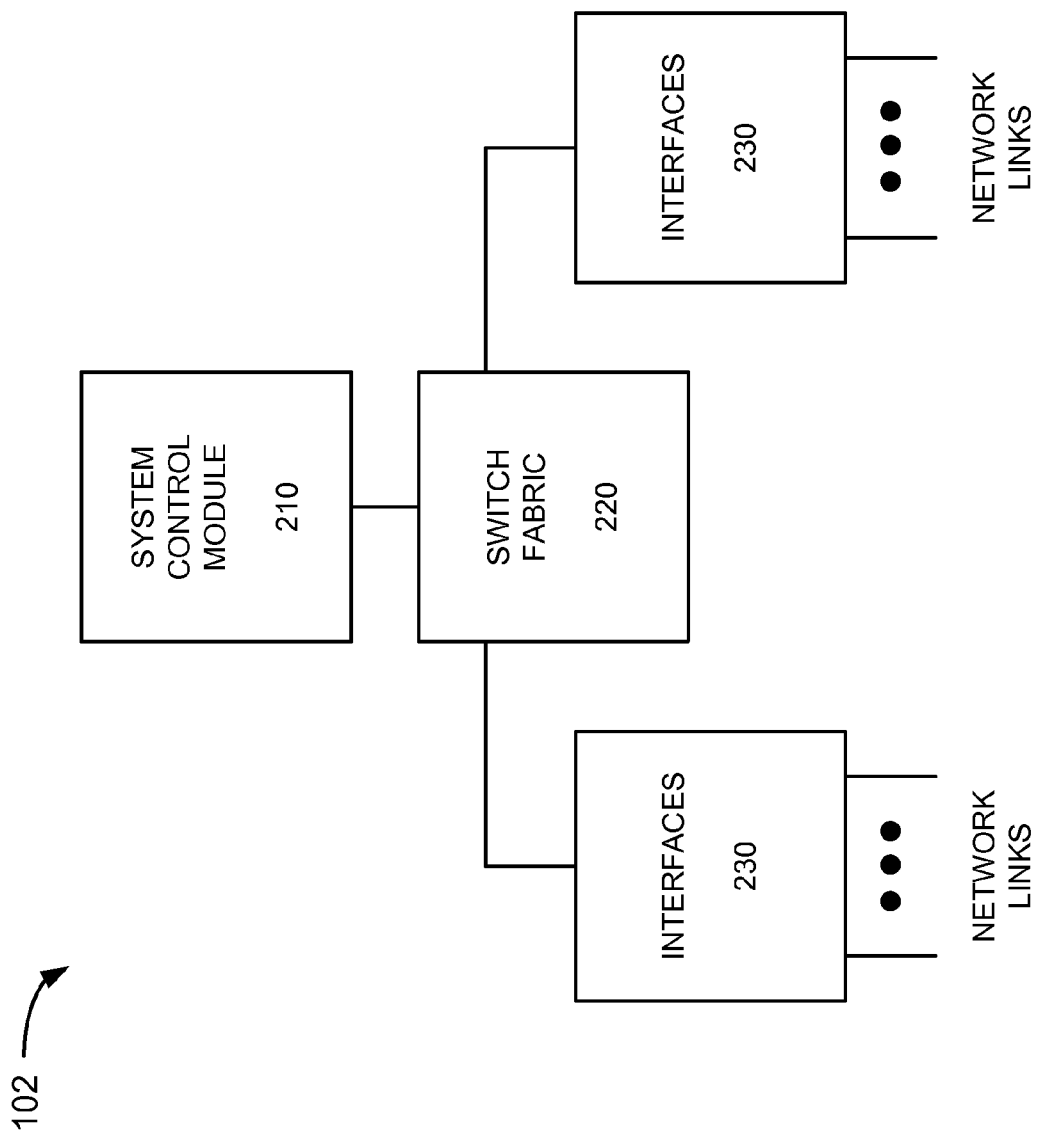
FIG. 2 is a block diagram illustrating exemplary components of a network device of FIG. 1.

FIG. 2 is a block diagram illustrating exemplary components of network device 102. As shown in FIG. 2, network device 102 may include a system control module 210, a switch fabric 220, and a group of interfaces 230. In other implementations, network device 102 may include fewer, additional, different, or differently arranged components than those illustrated in FIG. 2.

System control module 210 may include one or more processors, microprocessors, application specific integrated circuits (ASICs), field programming gate arrays (FPGAs), and/or processing logic that may be optimized for networking and communications. System control module 210 may perform high level management functions for network device 102. For example, system control module 210 may communicate with other networks and systems connected to network device 102 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or more switching planes to facilitate communication among interfaces 230 and/or system control module 210. In one implementation, each of the switching planes may include a single or multi-stage switch of crossbar elements. Switch fabric 220 may also, or alternatively, include processors, memories, and/or paths that permit communication among system control module 210 and interfaces 230.

Interfaces 230 may include devices or assemblies, such as line cards, for receiving incoming data units from network links (or from other interfaces 230) and for transmitting the data units to network links (or to other interfaces 230). For example, interfaces 230 may include Ethernet interfaces, optical carrier (OC) interfaces, and/or asynchronous transfer mode (ATM) interfaces. Interfaces 230 may manage a set of input ports via which data units can be received and a set of output ports via which data units can be transmitted.

Depending on the implementation, the components that are shown in FIG. 2 may provide fewer or additional functionalities. For example, if network device 102 performs an Internet Protocol (IP) data unit routing function as part of a Multi-Protocol Label Switching (MPLS) router, system control module 210 may perform tasks associated with obtaining routing information from other routers in a MPLS network. In such cases, conveying network traffic from one interface to another may involve label-based routing, rather than IP address-based routing.

Figure 3:
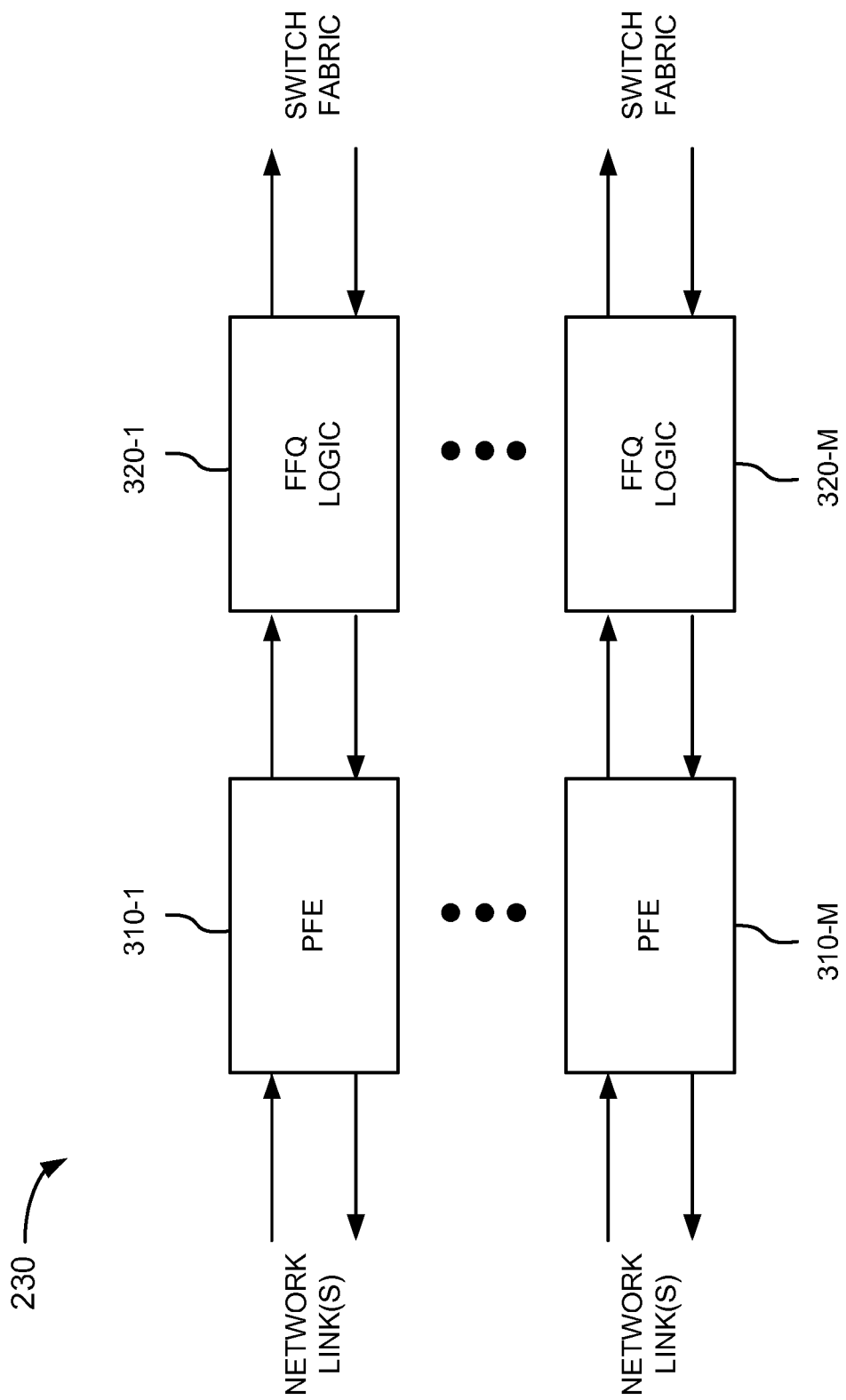
FIG. 3 is a block diagram illustrating exemplary components of an interface of FIG. 2.

FIG. 3 is a block diagram illustrating exemplary components of interface 230. As shown in FIG. 3, interface 230 may include one or more packet forwarding engines (PFEs) 310-1, . . . , 310-M (collectively referred to herein as "PFEs 310," or individually as "PFE 310") ($M \geq 1$), and one or more flow management and fabric queuing (FFQ) logic 320-1, . . . , 320-M (collectively, and individually, referred to herein as "FFQ logic 310"). In other implementations, interface 230 may include fewer, additional, different, or differently arranged components than those illustrated in FIG. 3.

PFEs 310 may each include hardware, or a combination of hardware and software, that may receive, store, process, and/or forward data units. For example, PFEs 310 may process data units received from incoming network links and prepare data units for transmission on outgoing network links PFEs 310 may make forwarding decisions based on header information of the data units. PFEs 310 may each include a memory to aid in the storing, processing, and/or forwarding of received data units. PFEs 310 may transmit received data units to FFQ logic 320.

To make a forwarding decision based on a received data unit, for example, a PFE 310 may identify, based on certain fields in the header of the received data unit, a logical output port for the received data unit. A logical output port may correspond to one or more physical output ports (referred to as a "port group"). Higher level protocols (e.g., routing protocols) can determine a set of paths that are possible alternative ways of reaching a particular destination. A port group may be established that includes the physical output ports that are connected to these paths. PFE 310 may include information regarding the logical output port, such as a logical port number, when transmitting a data unit to FFQ 320.

FFQ logic 320 may include hardware, or a combination of hardware and software, that may receive data units from PFEs 310 and dynamically assign a physical output port to a data unit based on a data flow with which the data unit is associated and a current utilization of the physical output ports. Also, FFQ logic 320 may create a table entry for the data flow in a flow table and monitor flow statistics relating to the data flow. In one implementation, FFQ logic 320 may use a timer for each data flow to track the timing of data units for the data flow, and a set of counters for each data flow to track data unit/byte counts for the data flow.

Figure 4:
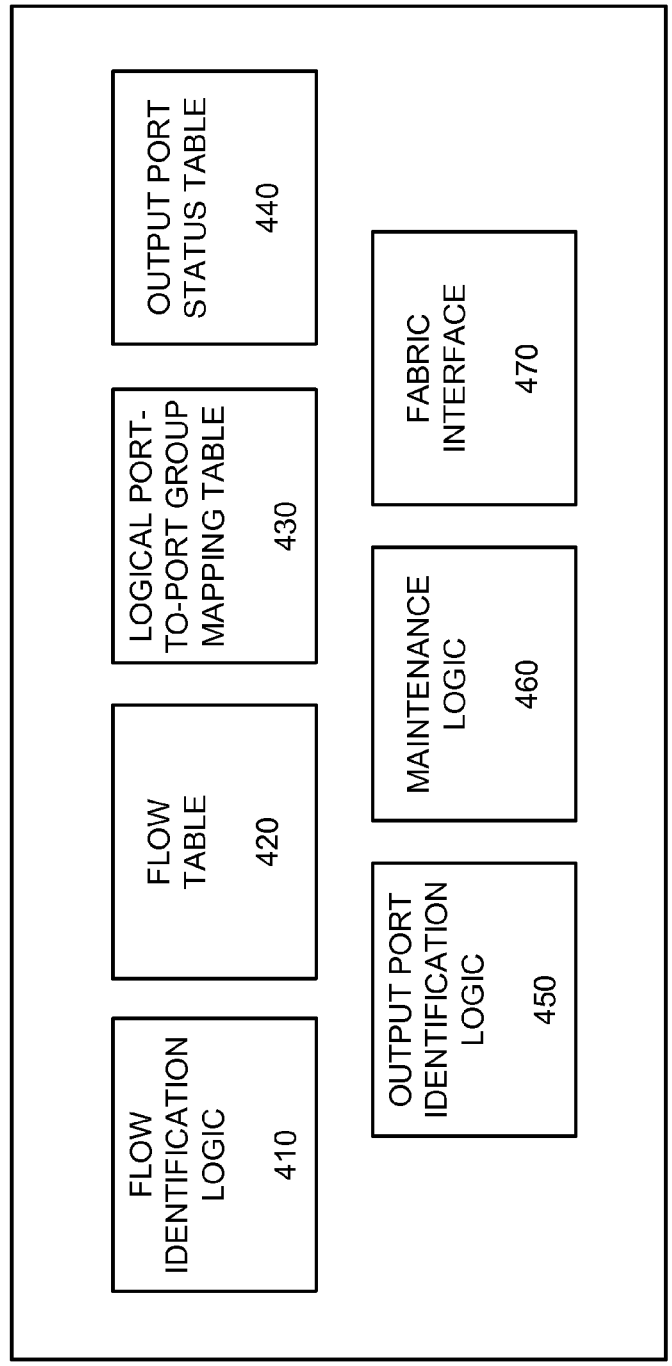
FIG. 4 is a block diagram illustrating exemplary functional components of flow management and fabric queuing logic of FIG. 3.

FIG. 4 is a block diagram illustrating exemplary functional components of FFQ logic 320. As shown in FIG. 4, FFQ logic 320 may include flow identification logic 410, a flow table 420, a logical port-to-port group mapping table 430, an output port status table 440, output port identification logic 450, maintenance logic 460, and a fabric interface 470. In another implementation, FFQ logic 320 may include fewer, additional, different, or differently arranged components than those illustrated in FIG. 4. For example, in some implementations, one or more of the functional components of FIG. 4 may be located external to FFQ logic 320. Also, or alternatively, one or more of the functions described as performed by one of the functional components may be performed by another one of the functional components.

Flow identification logic 410 may include hardware, or hardware in combination with software, that may receive a data unit from PFE 310, determine a flow identifier from the data unit (e.g., read the flow identifier from the data unit or generate the flow identifier based on information in the data unit), and provide information regarding the data unit and the flow identifier to create and/or update information regarding the data flow in flow table 420. Flow identification logic 410 may identify the flow identifier from information in the header of the data unit. For example, the flow identifier may be constructed from information in the data unit header that relates to the source address, the destination address, the source port, the destination port, and/or the protocol. As explained above, in one implementation, the flow identifier may be calculated as a hash value of the information in the data unit header and may be used to identify an entry in flow table 420.

Flow identification logic 410 may, upon identification of the flow identifier associated with a data unit, determine if an entry corresponding to the flow identifier has been previously created in flow table 420. For example, flow identification logic 410 may compare the flow identifier to information in flow table 420 to determine whether there is a match. If no entry exists, a corresponding entry may be made in flow table 420. If, however, a corresponding entry had been previously created in flow table 420 (i.e., at least one prior data unit belonging to the data flow had been previously received by network device 102), flow identification logic 410 may update one or more fields in the corresponding entry to reflect the newly received data unit.

Flow table 420 may be implemented within a memory device, such as one or more dynamic RAMs (DRAMs). Flow table 420 may include a number of entries corresponding to data flows identified by network device 102. For example, each entry in flow table 420 may include a flow identification field used to identify each data flow, other associated fields of information corresponding to data unit handling (e.g., port or interface information, protocol information, etc.), as well as output port fields to identify assigned output ports. Flow table 420 may include information regarding a large number of data flows, such as over one million data flows. In one implementation, flow table 420 may include up to four million or more different flow entries.

Figure 5:
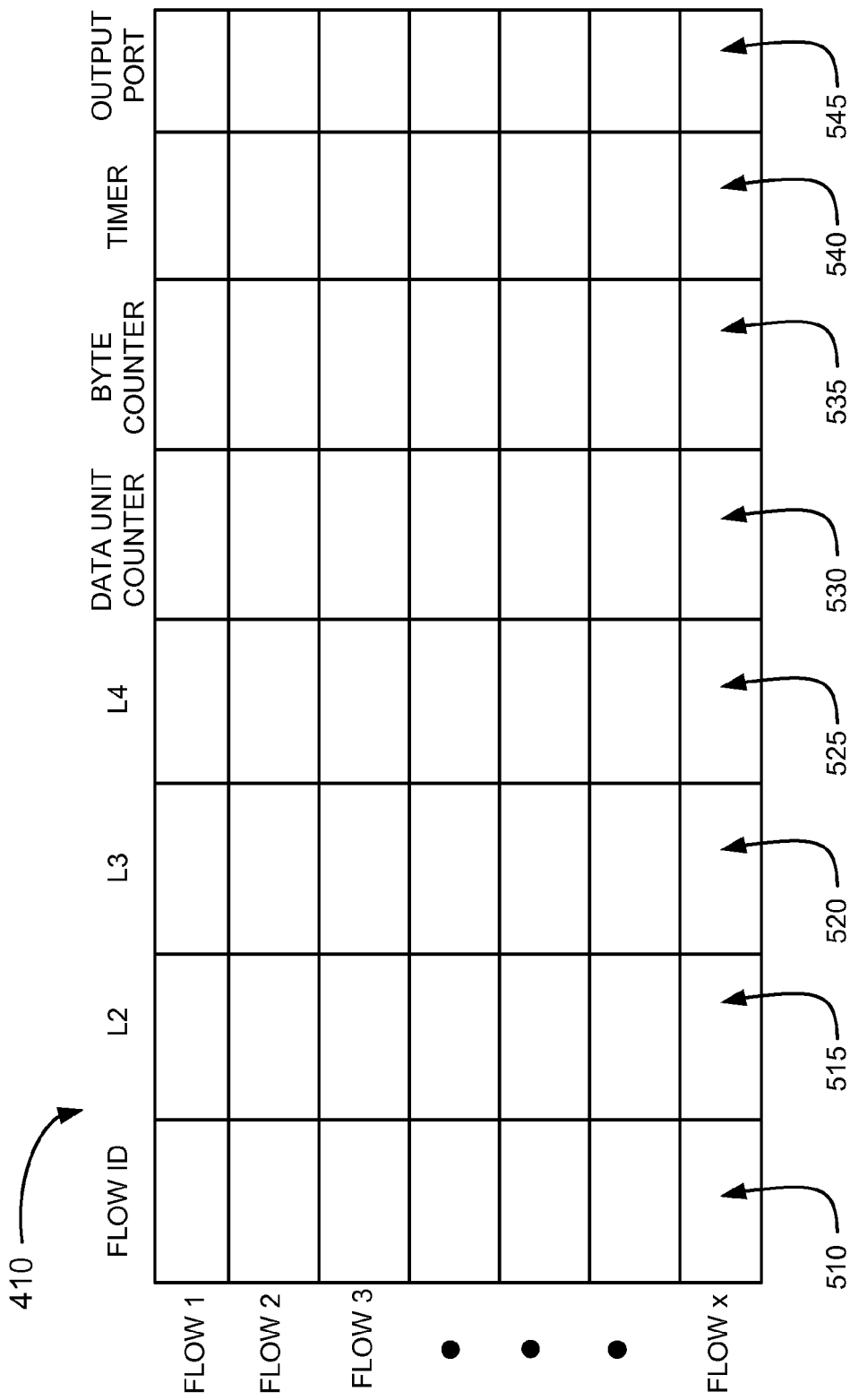
FIG. 5 is a diagram of exemplary fields of the flow table of FIG. 4.

FIG. 5 is a diagram of exemplary fields of flow table 420. As shown in FIG. 5, flow table 420 may include a number of flow table entries for each of data flows 1 through x. Exemplary flow table entries may include a flow identification (ID) field 510, a layer 2 (L2) information field 515, a layer 3 (L3) information field 520, a layer 4 (L4) information field 525, a data unit counter field 530, a byte counter field 535, a timer field 540, and an output port field 545.

Flow identification field 510 may include a unique, or a substantially unique, flow identifier associated with a particular data flow. For example, flow identifier may include a value derived from certain information in a header of a data unit corresponding to the data flow. For example, the flow identifier may be constructed from information, in the data unit header, that relates to the source address, the destination address, the source port, the destination port, and/or the protocol. In one implementation, the flow identifier may be calculated as a hash value of the information in the data unit header. The flow identifier may provide an efficient way to identify and locate data flows in flow table 420.

L2 information field 515 may include elements of L2 information, such as a source media access control (MAC) address associated with the data unit, a destination MAC address associated with the data unit, etc. L3 information field 520 may include elements of L3 information, such as source and destination IP (Internet Protocol) addresses, an L3 protocol (e.g., http, ftp), etc. L4 information field 525 may include one or more elements of L4 information, such as source and destination port information (which often designates an application type associated with a data unit), L4 protocol information, etc.

Data unit counter field 530 may include information for accumulating and/or indicating a total number of data units, corresponding to a data flow, that have been passed through interfaces 230 during a particular time period. Byte counter field 535 may include information for accumulating and/or indicating a total number of bytes that have been transferred in the data flow during the particular time period. Timer field 540 may include timing information or a timestamp relating to data units received in the data flow. Output port field 545 may include information identifying a physical output port assigned to the data flow.

In one embodiment, L2 field 515 may include source and destination MAC addresses, L3 field 520 may include source and destination IP addresses and a L3 protocol type, and L4 field 525 may include source and destination ports and a L4 protocol type. The value of timer field 540, data unit counter field 530, and byte counter field 535 may be periodically reset or accumulated to provide a total count associated with a particular data flow.

Returning to FIG. 4, logical port-to-port group mapping table 430 may include a table that maps logical output ports to port groups. For example, an entry in logical port-to-port group mapping table 430 may include information regarding a logical output port (e.g., a logical output port number) and information regarding a port group (e.g., a port group number or a set of physical output port numbers assigned to the port group).

Output port status table 440 may include a table that stores information regarding the state of the physical output ports. For example, output port status table 440 may include an entry for each physical output port and identify whether that output port is available or unavailable. An output port may be unavailable if the network link, to which the output port connects, has failed. Each entry in output port status table 440 may also include bandwidth statistics about the average and peak utilization of each physical output port. Each entry in output port status table 440 may further include flow statistics that indicate how many active flows are currently assigned to any physical output port. The bandwidth and flow statistics in the output port status table 440 may be consulted by output port identification logic 450 when selecting one of the physical ports that is a member of the port group for a logical port for a given flow.

In some situations, it may be beneficial for output port status table 440 to maintain real time (or near real time) information regarding the state of the physical output ports. In these situations, PFEs 310 and FFQ logic 320 may exchange information among themselves (possibly via switch fabric 220) to update the output port state. PFEs 310 may aggregate the information and pass the information to the corresponding FFQ logic 320. In other situations, it may be unnecessary to maintain real time information regarding the state of the physical output ports. In these situations, system control module 210 may periodically poll the output ports to determine the state of the output ports. System control module 210 may then update the information in output port status table 440 of FFQ logic 320.

Output port identification logic 450 may include hardware, or hardware in combination with software, that may select an output port for the data flow corresponding to the received data unit. Output port identification logic 450 may, for example, identify the physical output ports assigned to a port group. In one implementation, output port identification logic 450 may obtain this information from logical port-to-port group mapping table 430. Alternatively, output port identification logic 450 may obtain this information itself using, for example, a table that may map port groups to the physical output ports assigned to the port groups.

Output port identification logic 450 may monitor the utilization of the physical output ports. For example, output port identification logic 450 may determine which output ports are available and which are unavailable based, for example, on information from output port status table 440. Output port identification logic 450 may also determine the optimal physical output port for a target logical port based on the output port utilization statistics maintained in output port status table 440. For example, output port identification logic 450 may choose the output port with the lowest utilization out of several possible physical output ports when selecting a physical port to assign to a flow.

If a received data unit is associated with a data flow for which an entry already exists in flow table 420, output port identification logic 450 may determine whether the amount of time since a last data unit was received for the data flow is greater than a threshold value (hereinafter referred to as a "first amount of time") (e.g., thirty seconds). If a data unit has been received within the first amount of time, then output port identification logic 450 may determine the output port for the received data unit from output port field 545 in flow table 420.

If a data unit has not been received within the first amount of time, then output port identification logic 450 may newly select an output port for the data flow associated with the received data unit. A reason that output port identification logic 450 can make a new output port selection in this situation is that there is almost no chance for the received data unit to become out of order with respect to any data unit received more than the first amount of time prior to the received data unit.

To make the output port selection, output port identification logic 450 may consider the current output port utilization of the physical output ports in the port group associated with the logical output port associated with the data flow, and select one of these physical output ports based on the current output port utilization, such as the least utilized output port. The output port utilization may be based on the capacity of the output port. In other words, the capacity of the output ports may differ (e.g., one output port may connect to a one Gigabit link while another output port may connect to a ten Gigabit link). Thus, the output port utilization may be based on the fraction of the capacity of the output port that is currently being used, rather than just the total bandwidth being used. Alternatively, or additionally, the output port utilization may be based on historical data associated with the data flows. For example, the output port utilization may take into account not only the current bandwidth used by the data flows, but also the amount of bandwidth used by the data flows in the past. Output port utilization may additionally be based on the number of active flows that are assigned to the output port.

In an alternative implementation, output port identification logic 450 may also consider flow control information in determining the current output port utilization. For example, Ethernet protocol allows link level flow control where a downstream network device on an output link can send a message to stop the upstream network device from sending traffic for a specified period of time. From the perspective of the upstream network device, when such a flow control message is received on a particular output port, the amount of bandwidth sent out on that output port may be reduced. In this implementation, output port identification logic 450 may take flow control information into account during the output port selection process.

Output port identification logic 450 may store information identifying the selected output port in output port field 545 of the entry in flow table 420 corresponding to the data flow associated with the received data unit. In the situation described above, it may be possible for the selected output port to match the output port already assigned to the data flow (e.g., when the already-assigned output port is the least utilized output port or is not an overutilized output port). In this case, output port identification logic 450 need not update output port field 545 of flow table 420.

If the received data unit is not associated with a data flow for which an entry already exists in flow table 420, output port identification logic 450 may select an output port for the data flow. In one implementation, output port identification logic 450 may select an output port, from the group of physical output ports in the port group associated with the data flow, based on the current utilization of the output ports, as explained above. Output port identification logic 450 may store information identifying the selected output port in output port field 545 of the entry in flow table 420 created by flow identification logic 410 for the data flow associated with the received data unit.

Maintenance logic 460 may include hardware, or hardware in combination with software, that may perform one or more maintenance functions on flow table 420. One maintenance function may involve analyzing a data flow to determine whether a new output port selection should be made. In one implementation, maintenance logic 460 may analyze the information in timer field 540 to determine whether the amount of time since a last data unit was received for the data flow is greater than a threshold value (hereinafter referred to as a "second amount of time") (which may be equal to (or different from) the first amount of time identified above). When the amount of time since the last data unit was received is greater than the second amount of time, maintenance logic 460 may select a new output port for the data flow. Selection of the new output port may, in one implementation, involve maintenance logic 460 sending an instruction, along with any relevant information, to output port identification logic 450 to make the output port selection, as described above. When the last data unit was received within the second amount of time, then maintenance logic 460 may analyze another data flow to determine whether the amount of time since a last data unit was received for that data flow is greater than the second amount of time.

Another maintenance function may involve determining whether to remove an entry, corresponding to a particular data flow, from flow table 420. In one implementation, maintenance logic 460 may analyze the information in timer field 540 to determine whether the amount of time since a last data unit was received for the particular data flow is greater than a threshold value (hereinafter referred to as a "third amount of time") (which may be greater than the second amount of time). When the amount of time since the last data unit was received is greater than the third amount of time, maintenance logic 460 may remove the entry from flow table 420. In one implementation, removal of an entry may simply correspond to making the entry available to store information from a new data flow. When the last data unit was received within the third amount of time, then maintenance logic 460 may analyze another data flow to determine whether the amount of time since a last data unit was received for that data flow is greater than the third amount of time.

Fabric interface 470 may include hardware, or a combination of hardware and software, that may provide an interface to PFE 310 and/or switch fabric 220. Fabric interface 470 may include one or more interfacing queues or buffers (not shown) for temporarily storing data units that await transmission from FFQ logic 320. In one implementation, fabric interface 470 may include a separate queue for each output port. Additionally, or alternatively, fabric interface 470 may include separate queues for different priority levels that may be assigned to the data units. Thus, fabric interface 470 may include separate queues per port and per priority. In other implementations, fabric interface 470 may include some other arrangement of queues.

Fabric interface 470 may also include an arbiter that selects data units for transmission from the queues. In one implementation, the arbiter may use a fair selection technique based on data unit priority and/or output port availability. For example, the arbiter may select the highest priority data unit destined for an output port that is available to receive the data unit.

Exemplary Processes

Figure 6:
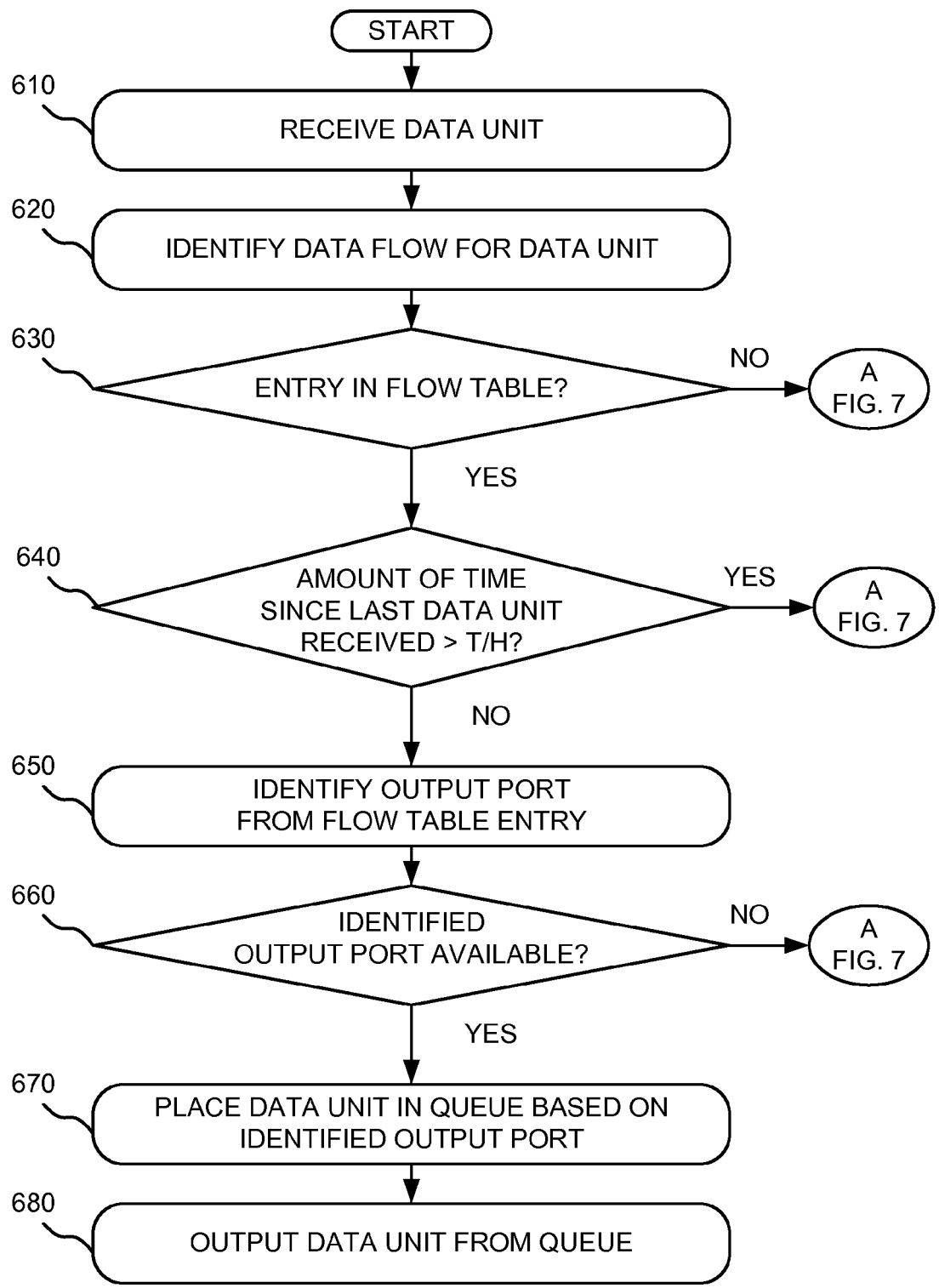
FIGS. 6 and 7 illustrate a flowchart of an exemplary process for processing a data unit.
Figure 7:
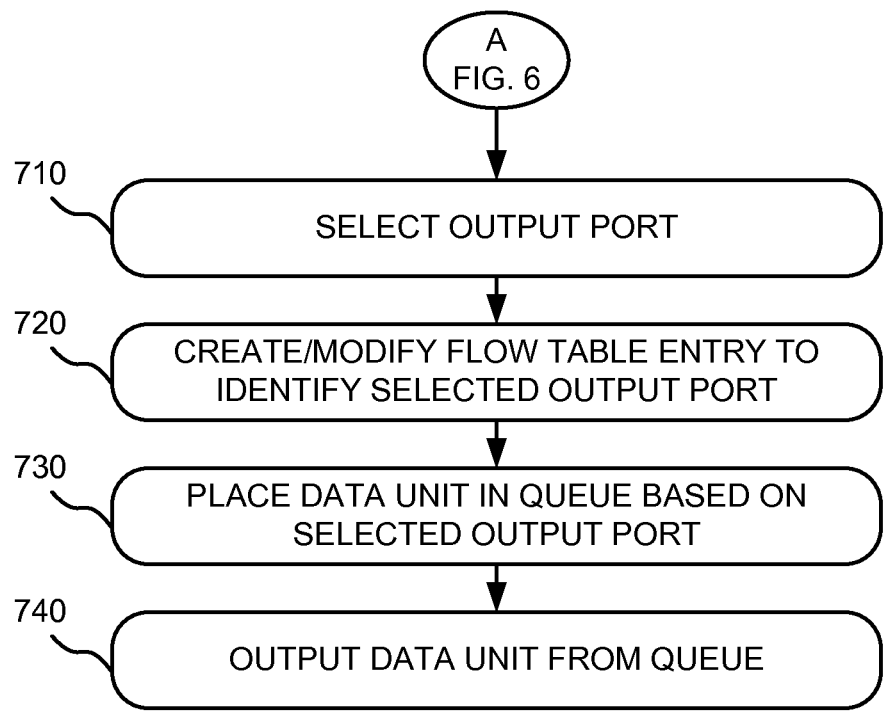

FIGS. 6 and 7 illustrate a flowchart of an exemplary process for processing a data unit. The process illustrated in FIGS. 6 and 7 may be performed by FFQ logic 320, or another component separate from or in conjunction with FFQ logic 320. The process may begin with a data unit being received (block 610) (FIG. 6). For example, FFQ logic 320 may receive, from PFE 310, a data unit and information regarding a logical output port to which the data unit is assigned.

The data flow associated with the data unit may be identified (block 620). For example, flow identification logic 410 may determine a flow identifier from the data unit (e.g., read the flow identifier from the data unit or generate the flow identifier from information in the data unit). As described above, flow identification logic 410 may identify the flow identifier from information in the header of the data unit, such as the source address, the destination address, the source port, the destination port, and/or the protocol. In one implementation, the flow identifier may be calculated as a hash value of the information in the data unit header.

It may be determined whether there is an entry in flow table 420 corresponding to the data flow (block 630). For example, flow table 420 may be searched, using the flow identifier, to determine whether flow table 420 includes an entry with a matching flow identifier in, for example, flow identification field 510.

If flow table 420 includes an entry corresponding to the data flow (block 630—YES), it may be determined whether it has been more than a threshold amount of time (e.g., first amount of time) since a last data unit in the data flow was received (i.e., more than the first amount of time has passed between reception of the current data unit and reception of the last data unit) (block 640). When the last data unit was received within the threshold (first) amount of time (block 640—NO), the physical output port for the data flow may be identified from the flow table entry (block 650). For example, output port identification logic 450 may determine the output port for the data unit from output port field 545 in flow table 420. In this case, an output port may be identified without having to perform logical port-to-physical port mapping and without having to determine the utilization of the output ports.

It may be determined whether the output port is available (block 660). For example, output port identification logic 450 may check output port status table 440 to determine whether the output port identified in output port field 545 is available or unavailable. As explained above, an output port may be unavailable when the link, to which the output port connects, has failed.

If the identified output port is available (block 660—YES), then the data unit may be placed in a queue based on the identified output port (block 670). For example, fabric interface 470 may place the data unit in a queue assigned to the identified output port. If the data unit has an associated priority level, then fabric interface 470 may place the data unit in a queue corresponding to the identified output port and the priority level associated with the data unit.

The data unit may be output from the queue (block 680). For example, the data unit may remain in the queue until other data units that were placed in the queue, prior to the data unit, have been outputted from the queue. When the data unit reaches the front (or head) of the queue, the data unit may be selected for outputting from the queue, based on the priority of the data unit (if any), when the identified output port is available to receive the data unit.

If flow table 420 does not include an entry corresponding to the data flow (block 630—NO), if the last data unit was not received within the threshold (first) amount of time (block 640—YES), or if the identified output port is unavailable (block 660—NO), then an output port may be selected (block 710) (FIG. 7). For example, to make the output port selection, output port identification logic 450 may consult logical port-to-port group mapping table 430 to identify a port group associated with the data flow. Output port identification logic 450 may also identify the physical output ports assigned to the port group. Output port identification logic 450 may consider the current output port utilization of these output ports and select one of the output ports based on the current output port utilization, such as the least utilized output port. As explained above, in one implementation, the output port utilization may be based on the capacity of the output port, the total bandwidth being used by the output port, and/or flow control information associated with the output port. As also described above, the output port utilization may be based on historical bandwidth use by the data flows assigned to the output ports.

A flow table entry may be created or modified to identify the selected output port (block 720). For example, if an entry for the data flow does not exist in flow table 420, then flow identification logic 410 may create an entry for the data flow in flow table 420. In this case, output port identification logic 450 may store information identifying the selected output port in output port field 545 of the entry in flow table 420. If an entry for the data flow already exists in flow table 420, then output port identification logic 450 may modify information in output port field 545 of the entry in flow table 420 with information identifying the selected output port.

The data unit may be placed in a queue based on the selected output port (block 730). For example, fabric interface 470 may place the data unit in a queue assigned to the selected output port. If the data unit has an associated priority level, then fabric interface 470 may place the data unit in a queue corresponding to the selected output port and the priority level associated with the data unit.

The data unit may be output from the queue (block 740). For example, the data unit may remain in the queue until other data units that were placed in the queue, prior to the data unit, have been outputted from the queue. When the data unit reaches the front (or head) of the queue, the data unit may be selected for outputting from the queue, based on the priority of the data unit (if any), when the selected output port is available to receive the data unit.

Figure 8:
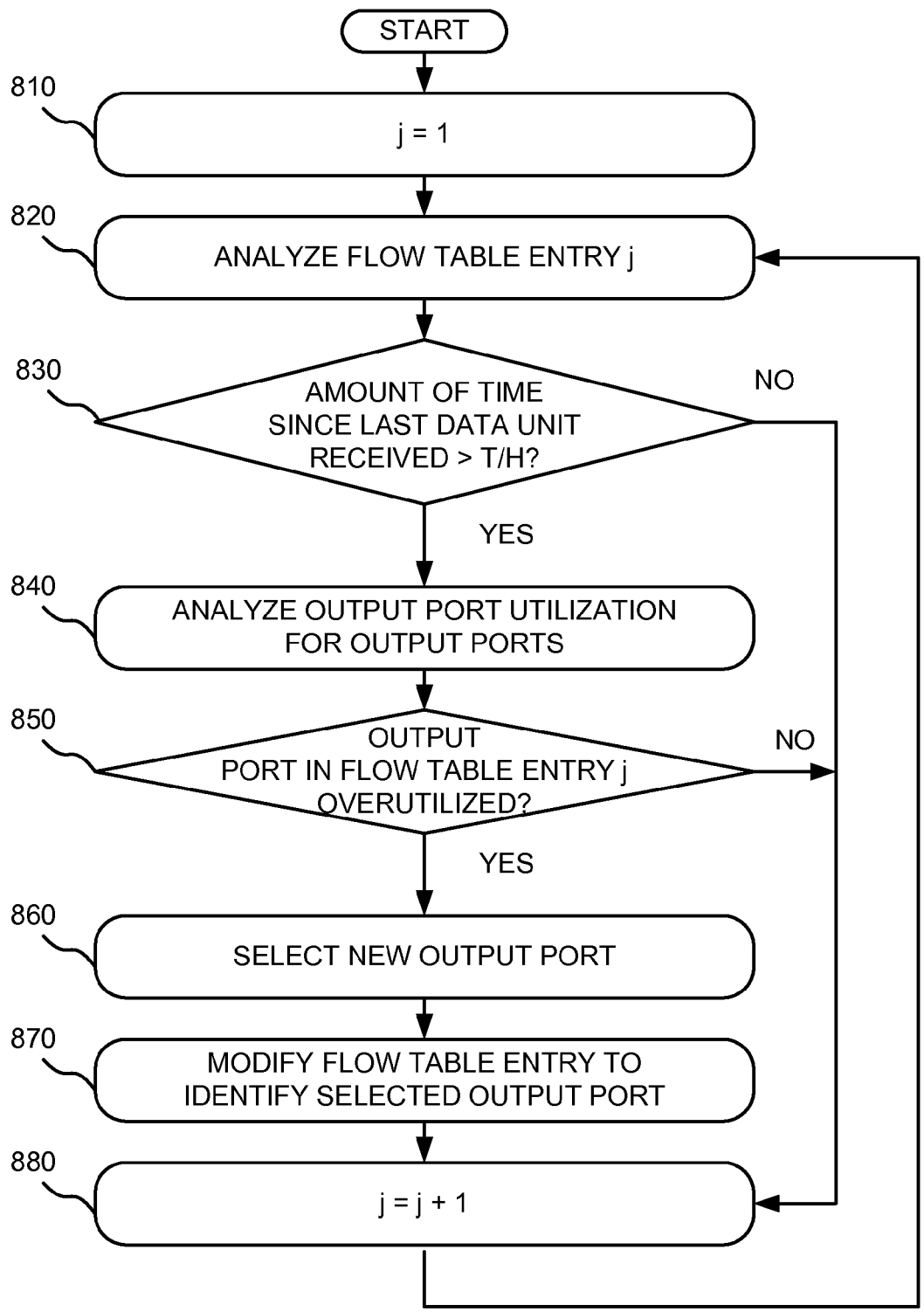
FIG. 8 illustrates a flowchart of an exemplary process for creating or modifying a flow table entry.

FIG. 8 illustrates a flowchart of an exemplary process for creating or modifying a flow table entry. The process illustrated in FIG. 8 may be performed by FFQ logic 320, or another component separate from or in conjunction with FFQ logic 320. The process may begin by setting a variable j equal to one (block 810). The flow table entry j may be analyzed (block 820). For example, maintenance logic 460 may read information from timer field 540 of entry j.

It may be determined whether it has been more than a threshold amount of time (e.g., second amount of time) since a last data unit in the data flow was received (block 830). For example, maintenance logic 460 may determine whether the information from timer field 540 is greater than the threshold.

When the last data unit was received greater than the threshold (second) amount of time (block 830—YES), then the output port utilization of the output ports, in the port group associated with the data flow, may be analyzed (block 840). For example, output port identification logic 450 may provide information regarding the current utilization of the output ports. The current utilization of an output port, as described above, may be based on the total bandwidth used at the output port, the capacity of the output port, and/or flow control information associated with the output port. Maintenance logic 460 may determine the current output port utilization based on the information from output port identification logic 450.

It may be determined whether the output port in entry j is overutilized (block 850). For example, maintenance logic 460 may compare the utilization of the output ports to determine whether the output port in entry j is overutilized with respect to the other output ports. This may be determined by comparing the fraction of the capacity of the output ports being used.

If the output port in entry j is overutilized (block 850—YES), then a new output port for the data flow corresponding to entry j may be selected (block 860). For example, maintenance logic 460 may consult logical port-to-port group mapping table 430 to identify a port group associated with the data flow. Maintenance logic 460 may also identify the physical output ports assigned to the port group. Maintenance logic 460 may consider the current output port utilization of these output ports and select one of these output ports based on the current utilization of the output ports. In one implementation, maintenance logic 460 may select the least utilized output port.

Entry j may be modified to identify the selected output port (block 870). For example, maintenance logic 460 may update entry j in flow table 420. More specifically, maintenance logic 460 may modify information in output port field 545 of entry j in flow table 420 with information identifying the selected output port.

The variable j may be updated (e.g., j may be set equal to j plus one) (block 880). Also, if the last data unit was received within the threshold (second) amount of time (block 830—NO) or if the output port in entry j is not overutilized (block 850—NO), then the variable j may be updated (block 880). The process may then return to block 820 to analyze the next entry in flow table 420.

In one alternative implementation, maintenance logic 460 may determine the average bandwidth use by the data flows assigned to a particular output port. Maintenance logic 460 may make this determination based, for example, on information in data unit counter field 530 and/or byte counter field 535 in flow table 420. Maintenance logic 460 may use this information to assign a data flow to an output port. For example, if the average bandwidth of a data flow is above a particular threshold and that data flow is assigned to a low speed output port, maintenance logic 460 may reassign the data flow to a higher speed output port.

Example

Figure 9:
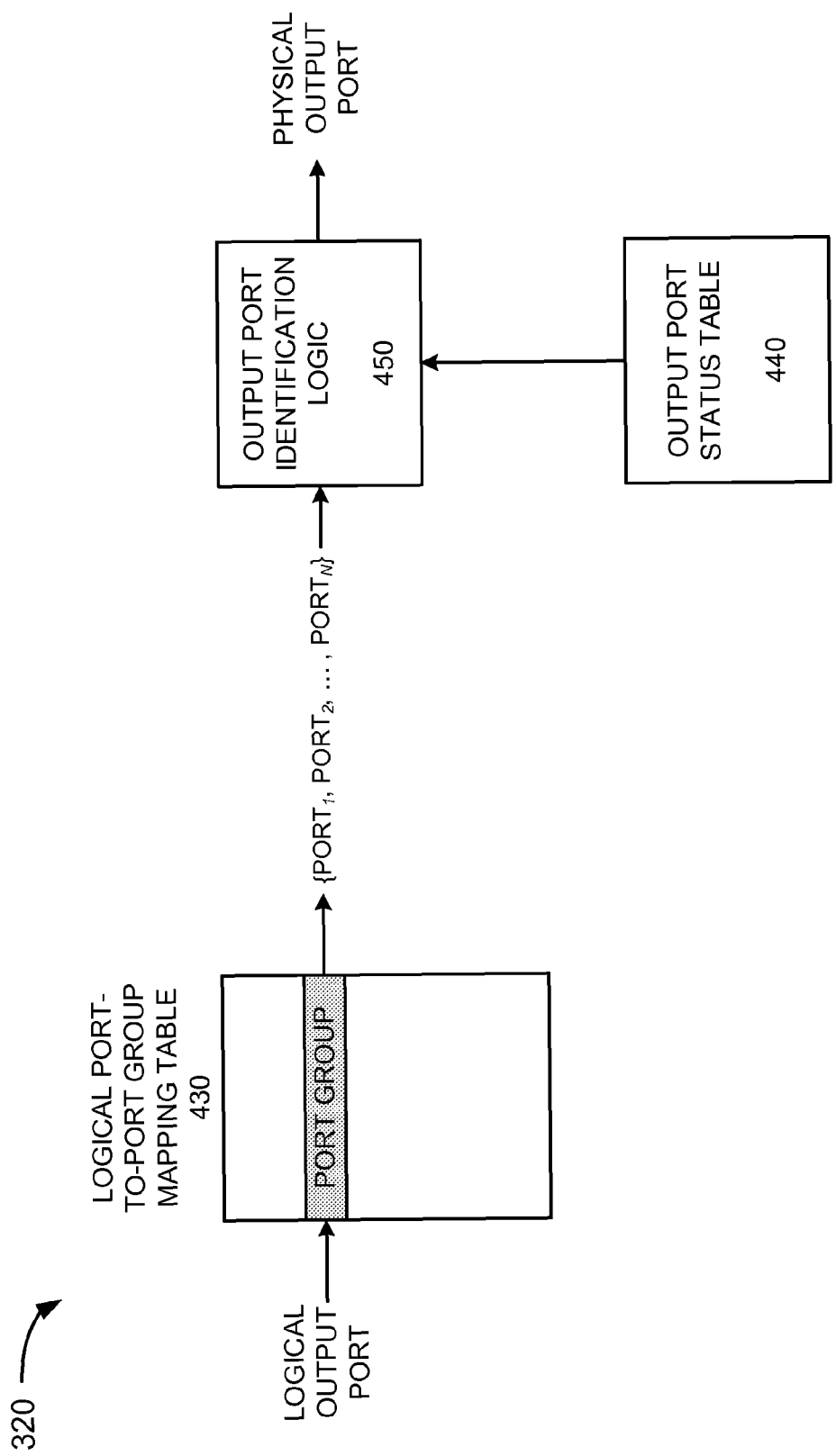
FIG. 9 is a diagram illustrating an example of a concept described herein.

FIG. 9 is a diagram illustrating an example of a concept described herein. As shown in FIG. 9, a data unit may be received by a PFE. The PFE may access its forwarding table using, for example, the destination address contained in the header of the data unit, to identify a logical port number. The PFE may send the data unit and the logical port number to the FFQ logic.

The FFQ logic may use the logical port number to identify a set of physical output ports (e.g., $port_1$, $port_2$, ..., $port_N$) that correspond to the logical port number. The FFQ logic may determine output port utilization information for each of the output ports in the set of physical output ports, as described above. In one implementation, this information may be input into a weighted random function that selects one of the output ports for the data flow. The weighted random function may assign weight values to the output ports based on the utilization information for the output ports, and may select one of the output ports based on the assigned weight values. The selected output port may correspond to the physical output port assigned to the data flow.

CONCLUSION

Implementations, described herein, may perform load balancing across output ports of a network device by dynamically assigning and/or re-assigning an output port to data units of a data flow based on the current utilization of the output ports while maintaining an order of the data units.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel.

Also, certain portions of the implementations have been described as "logic" that performs one or more functions. The term "logic," may include hardware, such as a processor, an ASIC, or a FPGA, or a combination of hardware and software (e.g., software running on a general purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
    identifying, by the device, a data flow associated with a data unit;
    determining, by the device, that a memory, of the device, includes an entry corresponding to the data flow,
        the memory storing information identifying one or more data flows, and
        the entry identifying a first output port, of a plurality of output ports of the device, assigned to the data flow;
    determining, by the device and based on the entry, an average bandwidth of the data flow after determining that the memory includes the entry corresponding to the data flow;
    assigning, by the device, the data flow to a second output port, of the plurality of output ports, different than the first output port when:
        the average bandwidth of the data flow exceeds a threshold, and
        a speed of the second output port is higher than a speed of the first output port; and
    modifying, by the device, the entry with information that identifies the second output port based on assigning the data flow to the second output port.

2. The method of claim 1, further comprising:
    storing the data unit in a queue corresponding to the second output port based on assigning the data flow to the second output port,
    where the data unit is transmitted from the queue to the second output port for transmission to a network associated with the device.

3. The method of claim 1, further comprising:
    assigning the data flow to the first output port prior to determining that the memory includes the entry corresponding to the data flow,
    where the data flow remains assigned to the first output port when the speed of the first output port is higher than the speed of the second output port.

4. The method of claim 3, further comprising:
    storing the data unit in a queue corresponding to the first output port; and
    outputting the data unit from the queue to the first output port for transmission to a network associated with the device.

5. The method of claim 1, further comprising:
    identifying another data flow associated with another data unit;
    determining an output port utilization of a third output port of the plurality of output ports; and
    assigning the other data flow to the third output port based on the output port utilization of the third output port.

6. The method of claim 5, where the output port utilization of the third output port is determined based on information identifying a portion of a capacity, of the third output port that is currently being used.

7. The method of claim 1, where determining the average bandwidth of the data flow includes:
    determining the average bandwidth of the data flow based on a data unit counter field, of the entry, identifying a total number of data units, of the data flow, passing through the device during a particular period of time.

8. The method of claim 1, where determining the average bandwidth of the data flow includes:
    determining the average bandwidth of the data flow based on a byte counter field, of the entry, identifying a total number of bytes that have been transferred in the data flow during a particular time period.

9. A device comprising:
    a memory to store instructions; and
    a processor to execute the instructions to:
        determine that a data structure, of the device, includes an entry corresponding to a data flow of a data unit received by the device,
            the data structure storing information identifying one or more data flows,
            the entry identifying a first output port, of a plurality of output ports of the device, assigned to the data flow;
        determine an average bandwidth of the data flow based on information included in the entry;
        assign the data flow to a second output port, of the plurality of output ports, different than the first output port when:
            the average bandwidth of the data flow exceeds a threshold, and
            a speed of the second output port is higher than a speed of the first output port; and
        modify the entry with information that identifies the second output port based on assigning the data flow to the second output port.

10. The device of claim 9, where the processor is further to execute the instructions to:
    receive the data unit; and
    identify the data flow based on at least one of a source address of the data unit, a destination address of the data unit, a source port of the data unit, a destination port of the data unit, or a protocol of the data unit,
    the at least one of the source address, the destination address, the source port, the destination port, or the protocol being included in a portion of the data unit.

11. The device of claim 9, where, when determining the average bandwidth of the data flow based on the information included in the entry, the processor is to execute the instructions to:
    determine the average bandwidth of the data flow based on at least one of:
        a data unit counter field, of the entry, identifying a total number of data units, of the data flow, passing through the device during a particular period of time, or
        a byte counter field, of the entry, identifying a total number of bytes that have been transferred in the data flow during the particular time period.

12. The device of claim 9, where the processor is further to execute the instructions to:
    store the data unit in a queue corresponding to the second output port; and output the data unit from the queue to the second output port for transmission of the data unit to a network associated with the device.

13. The device of claim 12, where the data unit is stored in the queue based on a priority level assigned to the data unit, and
where the data unit is output from the queue to the second output port based on the priority level.

14. The device of claim 9, where the processor is further to execute the instructions to:
identify another data flow associated with another data unit;
determine an output port utilization of a third output port of the plurality of output ports; and
assign the other data flow to the third output port based on the output port utilization of the third output port.

15. The device of claim 14, where the output port utilization of the third output port is determined based on information identifying a portion of a capacity, of the third output port that is currently being used.

16. A non-transitory computer readable medium storing instructions, the instructions comprising:
one or more instructions which, when executed by a processor of a device, cause the processor to determine that a data structure, of the device, includes an entry corresponding to a data flow of a data unit received by the device,
the data structure storing information identifying one or more data flows,
the entry identifying a first output port, of a plurality of output ports of the device, assigned to the data flow;
one or more instructions which, when executed by the processor, cause the processor to determine an average bandwidth of the data flow based on information included in the entry;
one or more instructions which, when executed by the processor, cause the processor to determine, based on the entry, an average bandwidth of the data flow after determining that the memory includes the entry corresponding to the data flow;
one or more instructions which, when executed by the processor, cause the processor to assign the data flow to a second output port, of the plurality of output ports, different than the first output port when:
the average bandwidth of the data flow exceeds a threshold, and
a speed associated with the second output port is higher than a speed associated with the first output port; and
one or more instructions which, when executed by the processor, cause the processor to modify the entry with information that identifies the second output port based on assigning the data flow to the second output port.

17. The non-transitory computer readable medium of claim 16, the instructions further comprising:
one or more instructions to assign the data flow to the first output port prior to determining that the data structure includes the entry corresponding to the data flow,
where the data flow remains assigned to the first output port when the speed associated with the first output port is higher than the speed associated with the second output port.

18. The non-transitory computer readable medium of claim 16, where the one or more instructions to determine the average bandwidth of the data flow based on the information included in the entry include:
one or more instructions to determine the average bandwidth of the data flow based on at least one of:
a data unit counter field, of the entry, identifying a total number of data units, of the data flow, passing through the device during a particular period of time, or
a byte counter field, of the entry, identifying a total number of bytes that have been transferred in the data flow during the particular time period.

19. The non-transitory computer readable medium of claim 16, the instructions further comprising:
one or more instructions to store the data unit in a queue corresponding to the second output port based on assigning the data flow to the second output port; and
one or more instructions to output the data unit from the queue to the second output port for transmission of the data unit to a network associated with the device.

20. The non-transitory computer readable medium of claim 19, where the data unit is stored in the queue based on a priority level assigned to the data unit, and
where the data unit is output from the queue to the second output port based on the priority level.

* * * * *